United States Patent [19]

Van Fisk, Jr. et al.

[11] 4,374,939
[45] Feb. 22, 1983

[54] MOLD WASH COMPOSITION

[75] Inventors: James Van Fisk, Jr.; John W. Jordan, both of Houston, Tex.

[73] Assignee: NL Industries, Inc., New York, N.Y.

[21] Appl. No.: 108,534

[22] Filed: Dec. 31, 1979

[51] Int. Cl.³ ............................................... C08K 3/34
[52] U.S. Cl. ..................................... 523/139; 524/449
[58] Field of Search ................... 260/29.6 H, 29.6 M, 260/29.6 Z; 523/139; 524/449

[56] References Cited

U.S. PATENT DOCUMENTS

| | | | |
|---|---|---|---|
| 3,068,185 | 12/1962 | Stamberger | 260/29.6 H |
| 3,558,545 | 1/1971 | Lummus | 260/29.6 H |
| 3,838,047 | 9/1974 | Le Blanc | 260/29.6 M |
| 4,010,135 | 3/1977 | Tutein | 260/29.6 M |
| 4,080,351 | 3/1978 | Zalzal | 260/29.6 Z |
| 4,089,831 | 5/1978 | Chambers | 260/29.6 Z |
| 4,163,000 | 7/1979 | Kashima | 260/29.6 H |

*Primary Examiner*—Paul R. Michl
*Attorney, Agent, or Firm*—Browning, Bushman, Zamecki & Anderson

[57] ABSTRACT

A composition for preparing water based mold washes which contains a clay of high swelling capacity in water, certain water soluble acrylic polymers, a particulate, refractory material and a solids suspension control agent comprised of a peptizer and a flocculant.

47 Claims, No Drawings

MOLD WASH COMPOSITION

BACKGROUND OF THE INVENTION

The present invention relates to compositions and formulations useful in preparing aqueous mold washes and, more particularly, to mold wash compositions containing water soluble acrylic polymers and high swelling clays.

In the molding or casting of metal, as for example in the production of cast iron articles in foundry operations, it is necessary that the mold and/or core be coated with a material to prevent sticking or adhering of the molten metal, e.g., iron, to the core or mold surface. Such coatings must be able to withstand high temperatures, e.g. 3,000° F. and greater. Additionally, the mold wash must provide a generally uniform coating on the core or mold to prevent excessive surface irregularties in the finished castings.

SUMMARY OF THE INVENTION

It is, therefore, an object of the present invention to provide a new composition for use in preparing mold wash formulations.

Another object of the present invention is to provide a dry mold wash additive formulation containing water soluble acrylic polymeric materials, high swelling clays and a refractory material.

Still another object of the present invention is to provide water based mold washes for forming coatings exhibiting excellent hot strength properties.

The above and other objects of the present invention will become apparent from the description given herein and the appended claims.

In one respect, the above objects are accomplished by a novel composition useful in the preparation of a high temperature, mold wash formulation comprising a dry intimate mixture of certain water soluble acrylic polymers, clays of high swelling capacity in water and a suspension control additive comprising (a) a peptizing agent and (b) a flocculant. The clay employed in the composition is of a type having a liquid limit number of greater than 600 and high swelling capacity in water. The peptizing agent can be any inorganic, water soluble compound which, in sufficient amount, acts in conjunction with a sufficient amount of the flocculant to control particle size and settling rates of the undissolved solids in a water slurry of the composition, the flocculant being a water soluble salt of a polyvalent metal.

In another embodiment of the present invention, there is provided a dry, high temperature mold wash additive formulation comprised of the above described composition and a suitable, particulate refractory material.

In yet a further embodiment of the present invention, there is provided an aqueous mold wash comprising water and the dry, high temperature mold wash additive formulation described above.

DESCRIPTION OF THE PREFERRED EMBODIMENTS

The term "mold wash", as used herein, is intended to include compositions used in any manner to provide substrate coatings which will prevent sticking, adhering or undesirable penetration of the substrate surface by hot, generally molten metals.

The clays which are useful in the compositions and formulations of the present invention are those having a liquid limit number greater than 600, where liquid limit number refers to the moisture content expressed as a percent by weight of the oven dried clay at which the clay will just begin to flow when jarred slightly. In addition, the clay will have high swelling capacity in water or other aqueous systems. Although other types of clays may be used, the preferred clays are of the smectite-type, particularly desirable varieties of such clays being the naturally occurring Wyoming variety of swelling bentonite and like clays, and hectorite, a swelling magnesium-lithium silicate clay. Additionally, smectite-type clay which are prepared synthetically can also be used in the compositions and formulations of the present invention.

The water soluble acrylic polymers used in the compositions and formulations of the present invention are formed by polymerizing, in either an emulsion or a solution process, a carboxylic acid having the general formula:

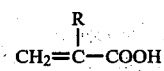

wherein R is selected from the class consisting of hydrogen, monovalent alkyl radicals, monovalent aryl radicals, monovalent aralkyl radicals, monovalent alkaryl radicals, and monovalent cycoaliphatic radicals. Particularly preferred acid monomers are acrylic acid, methacrylic acid and mixtures thereof because of their generally lower cost, ready availability and ability to form superior polymer.

The polymer used can be either a homopolymer i.e. produced from one of the monoolefinic acids described above, or an interpolymer of one of the monoolefinic acids and at least one other non-carboxylated unsaturated monomer which is copolymerizable with the acid monomer and which will form a water soluble polymer. The term "non-carboxylated", as used herein, refers to compounds which do not have a carboxylic acid group, i.e. —COOH or an acid anhydride grouping formed by elimination of one molecule of water from two carboxylic acid groups located on the same polycarboxylic acid molecule. Thus, virtually any polymerizable monomer which can be polymerized with the monoolefinic acid monomer to form a water soluble polymer can be employed. Especially preferred non-carboxylated unsaturated monomers which can be used to form the water soluble polymers used in the present invention include compounds having the general formula:

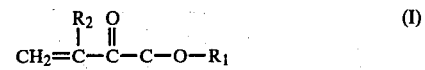

wherein $R_1$ is a member of the class consisting of alkyl groups having from 1 to 30 carbon atoms and R is hydrogen or a methyl group. Other useful non-carboxylated unsaturated monomers include compounds having the general formula:

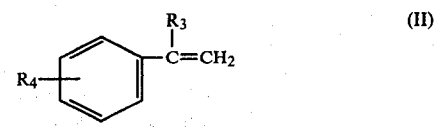

wherein $R_3$ is hydrogen or a methyl group and R is selected from the class consisting of hydrogen and alkyl groups having from 1 to 4 carbon atoms. Non-limiting examples of compounds having the general Formula II include styrene-methyl styrene vinyl toluene and the like. Other useful monomers are monoolefinics having from 2 to 4 carbon atoms such as ethylene, propylene, butylene, isobutylene as well as compounds having the general formula:

$$CH_2=CH-O-R_5 \quad (III)$$

wherein $R_5$ is an alkyl group having from 1 to 4 carbon atoms. Non-limiting examples of compounds having the general Formula III include vinyl methyl ether, vinyl ethyl ether, vinyl butyl ether, etc. Compounds having the general formula:

$$R_6-\overset{\overset{O}{\|}}{C}-O-CH=CH_2 \quad (IV)$$

wherein $R_6$ is an alkyl group having from 1 to 4 carbon atoms can also be employed. Non-limiting examples of compounds having the general Formula IV include vinyl acetate, vinyl propionate, vinyl butyrate and the like. Conjugated diolefins containing from 4 to 8 carbon atoms such as butadiene, 1,3-hexadiene, 1,3-octadiene, and the like as well as mixtures of various of the above enumerated compounds can be used.

As noted, a particularly preferred group of non-carboxylated unsaturated monomers useful in preparing the polymers used herein are the acrylic ester monomers represented by Formula I, particularly those in which R is an alkyl group having from 1 to 22 carbon atoms. Non-limiting examples of such alkyl acrylic esters include methyl acrylate, ethyl acrylate, butyl acrylate, hexyl acrylate, decyl acrylate, lauryl acrylate, stearyl acrylate, behenyl acrylate, methyl methacrylate, ethyl methacrylate, lauryl meth acrylate, stearyl methacrylate, behenyl methacrylate and mixtures thereof. Especially preferred monomers are methyl acrylate, ethyl acrylate, methyl methacrylate, and mixtures thereof.

When the water soluble polymer is an interpolymer including one of the non-carboxylated monomers, the latter will be present in amounts of from about 30 to about 80% by weight. This is particularly true when the non-carboxylated monomer comprises one of the preferred acrylic acid esters noted above. Accordingly, the water soluble acrylic polymers will comprise from about 20 to about 70% by weight of the monoolefinic acid monomer.

The compositions or formulations of the present invention include a suspension control additives comprising (a) a peptizing agent and (b) a flocculant. Although the action of a peptizing agent and a flocculant, in general, are in opposition to one another, it has been surprisingly found that unless both of these materials are present in the compositions and formulations, a suitable aqueous mold wash is not obtained. More specifically, the coatings on molds or cores are not satisfactory. While the mechanism of using both a peptizer and a flocculant is not fully understood, it is believed that the phenomenon involves both particle size control, particle suspension and viscosity control in the aqueous mold washes formulated. Thus, the flocculant, which would tend to effect coagulation by increasing particle size, ensures a solids particle size which will provide a suitable coating on the core or mold using the aqueous mold wash. At the same time, the peptizing agent keeps the solids particles from settling out from the slurry, a condition which would lead to non-uniform coating on the core or mold. Additionally, it has been found that without the flocculant and peptizer, shelf life of the mold washes is greatly decreased. Generally speaking, the peptizing agent will be a water soluble, inorganic compound. Non-limiting examples of suitable peptizing agents include the alkali metal carbonates, especially sodium carbonate, tetrasodiumpyroposphate (TSPP), etc.

The flocculant employed can be any one of numerous water soluble salts of polyvalent metal ions, particularly divalent and trivalent metal ions. Non-limiting examples include aluminum sulfate, ferric sulfate, etc.

The formulations of the present invention further contemplate the use of a particulate refractory material. Generally speaking, the refractory material can be any material which will withstand the temperatures at which the mold or core is to be subjected by the molten metal, and which is non-reactive with the other components of the formulation. Preferably, the refractory material will have a particle size of 200 mesh or finer. Non-limiting examples of suitable refractory materials include milled zirconium silicate, powdered crystalline graphite, mixed crystalline-amorphous graphite, milled olivine, milled silica, alumina, zircon, zirconia, kaolin, magnesite, chromite, silicon carbide, spinel, etc.

The present invention contemplates three embodiments. The first embodiment is a composition for use in preparing a dry, mold was formulation and will contain from about 80 to about 95% by weight of the clay, preferably from about 90 to about 95% of the clay; from about 0.5 to about 10% by weight of the polymer, preferably from about 0.75 to about 3.5% by weight of the polymer; an effective amount, up to about 10% by weight, of the flocculant; and, an effective amount, up to about 9% by weight of the peptizing agent.

The second embodiment comprises a dry formulation for use in preparing a mold wash and includes, in addition to the water soluble acrylic polymer, the clay and the solids suspension control additive, a particulate refractory material. In particular, the formulation contains from about 0.5 to about 10% by weight of the clay, preferably from about 1 to about 5% by weight of the clay; an effective amount, up to about 1% by weight, of the polymer; an effective amount, up to about 1% by weight, of the flocculant; an effective amount, up to about 1% by weight, of the peptizing agent; and from about 90 to about 97% by weight of the refractory material.

The third embodiment of the invention is an aqueous mold wash comprising a slurry of water, the water soluble acrylic polymer, the clay, the solids suspension control additive and the refractory material. The aqueous mold wash (slurry) will contain from about 45 to about 70% by weight water and from about 55 to about 30% by weight of the dry formulation containing the refractory material, i.e., the second embodiment formulation. The aqueous mold wash can be prepared by the separate addition of the ingredients if so desired. Thus, the mold wash slurry contains from about 0.5 to about 3.5% by weight of the clay; from about 0.01 to about 0.2% by weight of the polymer; from about 0.02 to about 0.5% by weight of the flocculant; from about 0.02 to about 0.5% by weight of the peptizing agent; from about 27 to about 53% by weight of the refractory material; and from about 45 to about 70% by weight water.

In preparing the dry compositions or formulations, any standard dry blending equipment which can be used to achieve an intimate mixture of the components can be employed. In preparing the aqueous mold washes (slurries), the mixing equipment selected should be of a type which will provide a uniform slurried mixture, considering that the slurry is a relatively viscous material.

Preferably, the aqueous mold washes and dry formulations prepared in accordance with the present invention will contain a weight ratio of clay/polymer of about 12 or greater. Also, it is preferred that the aqueous mold wash contain less than about 3% by weight clay. It has been found desirable, particularly in the case of foundry applications, that the aqueous mold wash have a viscosity in the range of from about 29 to about 100 cp when measured on an electric Fann (35A) viscometer at 600 rpm. It is also preferred that the aqueous mold wash have a hydrometer reading of greater than 35 and less than 90 as measured with a Dieterts #625 hydrometer.

In certain instances, it may be desirable to incorporate sufactants, surface active agents or like materials into the mold wash formulation to enhance the wettability characteristics of the formulation. Such enhanced wettability characteristics permit penetration of the formulation into the pores of the mold wash or core and thereby lead to more uniform and thorough coatings on the mold or core surfaces enhancing resistance to penetration of the hot or molten metal.

To further illustrate the invention, the following non-limiting examples are presented. In the examples which follow, all amounts are in percent by weight unless otherwise indicated. In all cases, the hydrometer readings (degrees Baume, °Be) were obtained on a Dieterts Hydrometer #625. Rhelogical data (viscosity) was obtained on a Fann Model 35A Viscometer at 600 rpm unless otherwise indicated. The clay used, unless otherwise indicated, was a Wyoming bentonite having a high swelling capacity in water, a liquid limit number in excess of 600, and is marketed under the trademark AQUAGEL by NL Baroid, Houston, Tex.

EXAMPLE I

This example demonstrates the use of various water soluble acrylic polymers in preparing the mold washes of the present invention. The dry formulations were made and mixed by hand. The dry formulations and water were then mixed for 10 minutes using a lab model F LIGHTNIN Mixer at 800 rpm. A typical casting core was dipped into each mold wash to check the coating ability of the mold wash. The compositions of the dry formulations and the mold washes are shown in Table I below. Rheological data on mold washes using five different acrylic polymers made in accordance with the formulations shown in Table I are shown in Table II below.

TABLE 1

| Component | Dry Formulation Without Refractory | Dry Formulation With Refractory | Mold Wash |
|---|---|---|---|
| 325 Mesh Zirconium Flour | — | 95.45 | 46.32 |
| 200 Mesh AQUAGEL | 98.2 | 4.25 | 2.06 |
| Acrylic Polymer | 2.3 | .10 | .05 |
| Anhydrous Na$_2$CO$_3$ | 4.5 | .20 | .10 |
| H$_2$O | — | — | 51.47 |

TABLE II

| Acrylic Polymer | Viscosity (Cp) |
|---|---|
| Romax RM-66[1] | 170 |
| Acryloid K-125[1] | 29 |
| Acryloid K-120N[1] | 29 |
| Acryloid KM641[1] | 30 |
| Ethyl acrylate (~34% by wt)-methacrylic acid (~66% by wt.) copolymer | 185 |

[1]Tradename of an acrylic polymer marketed by Rohm & Haas

All the mold wash formulations using the various acrylic polymers listed in Table II gave suitable coatings on the casting core after oven drying at 250° F. for 90 minutes. In the case of the Romax and ethyl acrylate/methacrylic acid polymers, the mold washes were much too viscous for practical commercial usage albeit that they could be used as mold washes. In the case of those two particular polymers, the mold wash should contain a flocculant in accordance with this invention. This example demonstrates that wide variations in the content of the acrylic polymer can be used, depending on the particular acrylic polymer employed.

EXAMPLE 2

This example demonstrates the effect of a flocculant, such as aluminum sulfate or ferric sulfate, on the rheological properties of an aqueous mold wash made in accordance with the present invention. The mold washes were mixed on a model F LIGHTNIN Mixer at 800 rpm. The compositional data on the dry formulation and mold washes and the rheological data on the mold washes are shown in Table III below:

TABLE III

| Component | Dry Formulation | Mold Wash | Dry Formulation | Mold Wash | Dry Formulation | Mold Wash | Dry Formulation | Mold Wash |
|---|---|---|---|---|---|---|---|---|
| 325 Mesh Zirconium Silicate Flour | 95.45 | 47.72 | 95.45 | 46.32 | 95.45 | 47.72 | 95.45 | 39.99 |
| 200 Mesh AQUAGEL | 4.20 | 2.10 | 4.25 | 2.06 | 4.20 | 2.10 | 4.20 | 1.76 |
| Romax RM-66 | .10 | .05 | .10 | .05 | .10 | .05 | .10 | .04 |
| Anhydrous Na$_2$CO$_3$ | .20 | .10 | .20 | .10 | .20 | .10 | — | — |
| Technical Grade Al$_2$(SO$_4$)$_3$.18 H$_2$O | .05 | .03 | — | — | — | — | .05 | .02 |
| Fe$_2$(SO$_4$)$_3$ | — | — | — | — | .05 | .03 | — | — |
| TSPP[1] | — | — | — | — | — | — | 0.20 | .08 |
| H$_2$O | — | 50.00 | — | 51.47 | — | 50.00 | — | 58.10 |
| Viscosity (cp) | — | 52 | — | 172 | — | 85 | — | 60 |

TABLE III-continued

| Component | Dry Formulation | Mold Wash | Dry Formulation | Mold Wash | Dry Formulation | Mold Wash | Dry Formulation | Mold Wash |
|---|---|---|---|---|---|---|---|---|
| °Be | — | 72 | — | 84 | — | 58 | | |

The aqueous mold washes shown in Table III provided adequate coatings on typical casting cores after the cores had been dipped in the mold washes and oven dried at 250° F. for 90 minutes.

EXAMPLE 3

In this example, various amounts of a dry formulation were slurried with various amounts of water to determine suitable slurry compositions to achieve adequate solids suspension and skin forming properties. In all cases, mixing of the slurries was done with a lab model F LIGHTNIN Mixer at 800 rpm. The slurries were mixed for 10 minutes after which the rheological properties were measured. The compositions of the dry formulation and various aqueous mold washes made therefrom, as well as rheological data are shown in Table IV below.

TABLE IV

| Component | Dry Formulation | Mold Wash #1 | Mold Wash #2 | Mold Wash #3 |
|---|---|---|---|---|
| 325 Mesh Zirconium Silicate Flour | 95.45 | 43.62 | 39.99 | 35.79 |
| 200 Mesh AQUAGEL | 4.20 | 1.92 | 1.76 | 1.57 |
| Romax-RM-66 | .10 | .05 | .04 | .04 |
| Anhydrous Na$_2$CO$_3$ Techincal Grade | .20 | .09 | .08 | .08 |
| Al$_2$(SO$_4$)$_3$.18 H$_2$O | .05 | .02 | .02 | .02 |
| H$_2$O | — | 54.30 | 58.10 | 62.50 |
| Viscosity (cp) | — | 70 | 53 | 37 |
| °Be | — | 69 | 45 | 38 |

As can be seen, mold washes having acceptable rheological properties can be achieved over a relatively wide concentration range with respect to the amount of the dry formulation in the slurried mold wash.

EXAMPLE 4

Various formulations were prepared to determine usable ranges of the various components in the formulations. The mold washes were made using a lab model F LIGHTNIN Mixer. All mold washes were mixed 10 minutes before testing. The mixing was done at 800 rpm except for Tests No. 4 and 11 in which cases the mixing was conducted at 1600 rpm. In addition to the Fann viscosity measurements, the viscosities were measured on a Brookfield Viscometer (RVT Model) at 50 rpm. A setling velocity was obtained by placing the mold washes in 50 ml graduated cylinders and measuring the depth of setling of solids per unit time. The data are shown in Table V.

TABLE V

| Component | Test #1 | Test #2 | Test #3 | Test #4 | Test #5 | Test #6 | Test #7 | Test #8 | Test #9 | Test #10 | Test #11 |
|---|---|---|---|---|---|---|---|---|---|---|---|
| 325 Mesh Zircon Flour | 45.32 | 46.32 | 46.32 | 46.32 | 46.32 | 46.32 | 46.32 | 46.32 | 46.32 | 46.32 | 45.32 |
| 200 Mesh AQUAGEL | 2.06 | 2.06 | 2.06 | 2.06 | 1.06 | 1.06 | 1.06 | 1.06 | 2.06 | 2.06 | 3.06 |
| Romax RM-66 | .02 | .05 | .10 | .15 | .05 | .10 | .15 | .15 | .05 | .05 | .05 |
| Anhydrous Na$_2$CO$_3$ (Technical) | .10 | .10 | .10 | .10 | .10 | .10 | .10 | — | .10 | .10 | .10 |
| Aluminum Sulfate | .05 | .05 | .05 | .05 | .05 | .05 | .05 | .05 | .10 | .20 | .05 |
| H$_2$O | 51.45 | 51.42 | 51.37 | 51.32 | 52.42 | 52.37 | 52.32 | 52.42 | 51.37 | 51.27 | 51.42 |
| °Be | 62 | 69 | 82 | 86 | 52 | 35 | 34 | 0 | 68 | 50 | 790 |
| Fann Viscosity (cp) | 42 | 74 | 118 | 127 | 44 | 45 | 47 | 21 | 53 | 33 | 180 |
| Brookfield viscosity (cp) | 426 | 940 | 1480 | 836 | 222 | 202 | 222 | 48 | 524 | 188 | 1340 |
| Settling Velocity (cm/hr) | .06 | .06 | .06 | .06 | 3.6 | 6.6 | 5' | 5 | 0.6 | 0.6 | — |

EXAMPLE 5

This example demonstrates the use of a clay which does not have high water swelling capacity. The clay used was BAROCO (Tradename of a calcium bentonite marketed by NL Baroid, Houston, Texas). The dry formulation was prepared by hand. A mold wash comprising a water slurry of the formulation was prepared by mixing the dry formulation with a Model F LIGHTNIN Mixer at 800 rpm. The slurry was mixed for 10 minutes. To check the coating ability of the mold wash, a typical casting core was dipped into the slurry. The compositional and rheological data are shown in Table VI below.

TABLE VI

| Component | Dry Formulation | Mold Wash |
|---|---|---|
| 325 Mesh Zircon Flour | 95.45 | 39.97 |
| BAROCO | 4.20 | 1.76 |
| Romax RM-66 | .10 | .04 |
| Na$_2$CO$_3$ | .20 | .08 |
| Al$_2$(SO$_4$)$_3$ | .05 | .02 |
| H$_2$O | — | 58.10 |
| Viscosity (cp) | — | 40 |
| °Be | — | 54 |

Although the viscosity and density appear to be in an acceptable range, the mold wash of this Example 5 formed very poor coatings on the casting cores. The skin-forming properties are inadequate for this mold wash prepared with clay having low water swelling capacity,

We claim:

1. A composition for use in a mold wash formulation comprising an intimate, dry mixture of a water soluble polymer of a monoolefinic carboxylic acid monomer having the general formula:

$$CH_2=\underset{\underset{R}{|}}{C}-COOH$$

wherein R is selected from the class consisting of hydrogen, monovalent alkyl radicals, monovalent aryl radicals, monovalent aralkyl radicals, monovalent alkaryl radicals and monovalent cycloaliphatic radicals, a clay having a liquid limit number of greater than 600 with high swelling capacity in water, and a solids suspension control additive comprising (a) a flocculant comprising a water soluble salt of a polyvalent metal ion, and (b) a peptizing agent.

2. The composition of claim 1 wherein said carboxylic acid monomer is selected from the group consisting of acrylic acid, methacrylic acid and mixtures thereof.

3. The composition of claim 2 wherein said polymer includes a non-carboxylated polymerizable monomer.

4. The composition of claim 3 wherein said non-carboxylated monomer is present in an amount of from about 30 to 80% by weight and said carboxylic acid monomer is present in an amount of from about 20 to about 70% by weight.

5. The composition of claim 3 wherein said non-carboxylated polymerizable monomer comprises a compound having the general formula:

$$CH_2=\underset{\underset{R_2}{|}}{C}-\underset{\underset{O}{\|}}{C}-O-R_1$$

wherein $R_1$ is a member of the class consisting of alkyl groups having from 1 to 30 carbon atoms and $R_2$ is hydrogen or a methyl group.

6. The composition of claim 5 wherein said non-carboxylated polymerizable monomer is selected from the class consisting of methyl acrylate, ethyl acrylate, methyl methacrylate and mixtures thereof.

7. The composition of claim 1 wherein said clay comprises a bentonite.

8. The composition of claim 1 wherein said clay is present in an amount of from about 80 to about 95% by weight.

9. The composition of claim 1 wherein said polymer is present in an amount of from about 0.5 to about 10% by weight.

10. The composition of claim 1 wherein said flocculant is present in an amount of up to about 10% by weight.

11. The composition of claim 1 wherein said flocculant comprises aluminum sulfate.

12. The composition of claim 1 wherein said peptizing agent is present in an amount of up to about 9% by weight.

13. The composition of claim 1 wherein said peptizing agent comprises an alkali metal carbonate.

14. The composition of claim 13 wherein said peptizing agent comprises sodium carbonate.

15. A formulation for use in preparing a mold wash comprising an intimate, dry mixture of a water soluble polymer of a monoolefinic carboxylic acid monomer having the general formula:

$$CH_2=\underset{\underset{R}{|}}{C}-COOH$$

wherein R is selected from the class consisting of hydrogen, monovalent alkyl radicals, monovalent aryl radicals, monovlent aralkyl radicals, monovalent alkaryl radicals and monovalent cycloaliphatic radicals, a clay having a liquid limit number of greater than 600 with high swelling capacity in water, a solids suspension control additive comprising (a) a flocculant comprising a water soluble salt of a polyvalent metal ion, and (b) a peptizing agent, and a particulate refractory material.

16. The formulation of claim 15 wherein said carboxylic acid monomer is selected from the group consisting of acrylic acid, methacrylic acid and mixtures thereof.

17. The formulation of claim 16 wherein said polymer includes a non-carboxylated polymerizable monomer.

18. The formulation of claim 17 wherein said non-carboxylated monomer is present in said polymer in an amount of from about 30 to about 80% by weight and said carboxylic acid monomer is present in an amount of from about 20 to about 70% by weight.

19. The formulation of claim 17 wherein said non-carboxylated polymerizable monomer comprises a compound having the general formula:

$$CH_2=\underset{\underset{R_2}{|}}{C}-\underset{\underset{O}{\|}}{C}-O-R_1$$

wherein $R_1$ is a member of the class consisting of alkyl groups having from 1 to 30 carbon atoms and $R_2$ is hydrogen or a methyl group.

20. The formulation of claim 19 wherein said non-carboxylated polymerizable monomer is selected from the class consisting of methyl acrylate, ethyl acrylate, methyl methacrylate and mixtures thereof.

21. The formulation of claim 15 wherein said clay comprises a bentonite.

22. The formulation of claim 15 wherein said clay is present in an amount of from about 0.5 to about 10% by weight.

23. The formulation of claim 15 wherein said polymer is present in an amount of up to about 1% by weight.

24. The formulation of claim 15 wherein said flocculant is present in an amount of up to about 1% by weight.

25. The formulation of claim 15 wherein said flocculant comprises aluminum sulfate.

26. The formulation of claim 15 wherein said peptizing agent is present in an amount of up to about 1% by weight.

27. The formulation of claim 15 wherein said peptizing agent comprises an alkali metal carbonate.

28. The formulation of claim 27 wherein said peptizing agent comprises sodium carbonate.

29. The formulation of claim 15 wherein the particle size of said refractory material is about 200 mesh or finer.

30. The formulation of claim 15 wherein said refractory material is present in an amount of from about 90 to about 97% by weight.

31. A mold wash comprising a slurry of:
a water soluble polymer of a monoolefinic carboxylic acid monomer having the general formula:

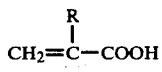

wherein R is selected from the class consisting of hydrogen, monovalent alkyl radicals, monovalent aryl radicals, monovalent aralkyl radicals, monovalent alkaryl radicals and monovalent cycloaliphatic radicals, a clay having a liquid limit number of greater than 600 with high swelling capacity in water, a solids suspension control additive comprising (a) a flocculant comprising a water soluble salt of a polyvalent metal ion, and (b) a peptizing agent, a particulate refractory material, and water.

32. The mold wash of claim 31 wherein said carboxylic acid monomer is selected from the group consisting of acrylic acid, methacrylic acid and mixtures thereof.

33. The mold wash of claim 32 wherein said polymer includes a non-carboxylated polymerizable monomer.

34. The mold wash of claim 33 wherein said non-carboxylated monomer is present in said polymer in an amount of from about 30 to about 80% by weight and said carboxylic acid monomer is present in an amount of from about 20 to about 70% by weight.

35. The mold wash of claim 33 wherein said non-carboxylated polymerizable monomer comprises a compound having the general formula:

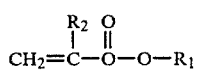

wherein $R_1$ is a member of the class consisting of alkyl groups having from 1 to 30 carbon atoms and $R_2$ is hydrogen or a methyl group.

36. The mold wash of claim 35 wherein said non-carboxylated polymerizable monomer is selected from the class consisting of methyl acrylate, ethyl acrylate, methyl methacrylate and mixtures thereof.

37. The mold wash of claim 31 wherein said clay comprises a bentonite.

38. The mold wash of claim 31 wherein said clay is present in an amount of from about 0.5 to about 3.5% by weight.

39. The mold wash of claim 31 wherein said polymer is present in an amount of from about 0.01 to about 0.2% by weight.

40. The mold wash of claim 31 wherein said flocculant is present in amounts of up to about 0.5% by weight.

41. The mold wash of claim 31 wherein said flocculant comprises aluminum sulfate.

42. The mold wash of claim 31 wherein said peptizing agent is present in said mixture in amounts of up to about 0.5% by weight.

43. The mold wash of claim 31 wherein said peptizing agent comprises an alkali metal carbonate.

44. The mold wash of claim 43 wherein said peptizing agent comprises sodium carbonate.

45. The mold wash of claim 31 wherein the particle size of said refractory material is about 200 mesh or finer.

46. The mold wash of claim 31 wherein said refractory material is present in an amount of from about 27 to about 53% by weight.

47. The mold wash of claim 31 wherein said water is present in said slurry in an amount of from about 45 to about 70% by weight.

* * * * *